July 5, 1938.  G. F. GERDTS  2,122,642
CONDUIT FOR STEAM CONDENSATE
Filed Sept. 2, 1936   2 Sheets-Sheet 1
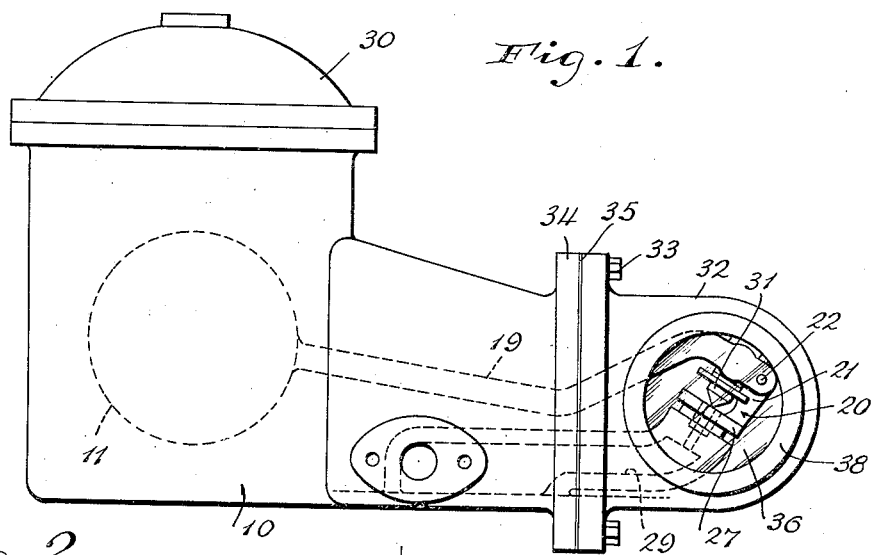
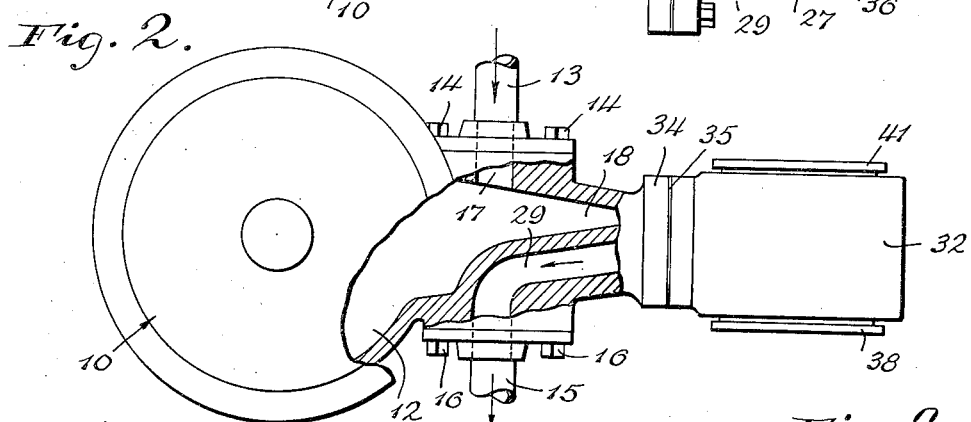
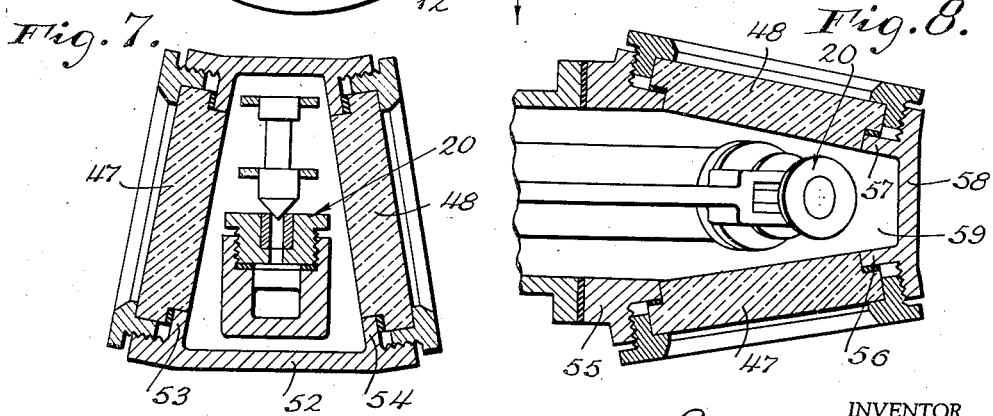
INVENTOR.
GUSTAV F. GERDTS
BY
Richards & Geier
ATTORNEYS INVENTOR.
GUSTAV F. GERDTS
BY
Richards & Geier
ATTORNEYS Patented July 5, 1938

2,122,642

UNITED STATES PATENT OFFICE 2,122,642

CONDUIT FOR STEAM CONDENSATE

Gustav F. Gerdts, Bremen, Germany

Application September 2, 1936, Serial No. 99,050
In Germany January 10, 1936

4 Claims. (Cl. 137—102)

This invention relates to a steam separator or a steam trap and refers more particularly to a device for removing water of condensation from steam conduits, heat installations, steam boiler plants and the like.

Devices of this type are very sensitive and break easily and must be constructed in such manner that the important parts thereof are easily accessible in order to enable the operator to inspect them and quickly determine the cause of a breakdown or the manner in which the device is operating.

Steam traps constructed heretofore have the disadvantage that their most important parts, namely the means interrupting the communication between the inlet and the outlet passages for the water are hidden from view by other parts so that they are not readily accessible to the operator.

An object of the present invention is the provision of a device for removing the condensate water, said device being constructed in such manner that all the vital parts thereof may be readily inspected by an operator.

Another object is the provision of a steam trap, all the important parts of which can be conveniently inspected while the device is in operation.

A further object is the provision of a steam trap casing carrying glass plates or lenses which will make the interior of the casing clearly visible to an observer and which will not be damaged by high pressure or temperatures.

The above and other objects of the present invention may be realized through the provision of a steam trap or the like, the valve mechanism of which is situated between a pair of lenses or other transparent bodies which are parallel to each other and to the central axis of the water passage leading to the valve mechanism.

These lenses, glass plates or the like are placed quite closely to the valve mechanism and are so arranged that their centers are situated substantially opposite to the operative valve surfaces.

The casing which supports the lenses or the glass plates is connected by bolts or the like with the main casing which encloses the valve mechanism, so that the glass supporting casing can be readily removed from the main casing for the purpose of cleaning the glass or for the purpose of repairing the device.

The device is so constructed that the removal of the casing carrying the glass will not interfere with the valve mechanism.

The main casing is provided with a projecting annular portion which contains the outlet passage for water and which carries the valve mechanism. The casing carrying the lenses or glass plates is adapted to enclose this projecting portion and the valve mechanism. Both the projecting annular portion and the valve mechanism are comparatively narrow in form so that the casing carrying the two lenses may be also narrow and elongated in form.

The invention will appear more clearly from the following detailed description when taken in connection with the accompanying drawings showing by way of example, preferred embodiments of the inventive idea.

Referring to the drawings:

Figure 1 shows in side elevation a device constructed in accordance with the principles of the present invention.

Figure 2 is a top view of the device shown in Figure 1 with some parts broken away.

Figures 6 and 7 are cross sectional views through two different modifications of the inventive idea.

Figure 8 is a partial horizontal section through a steam trap casing of a somewhat different form.

Figure 3:
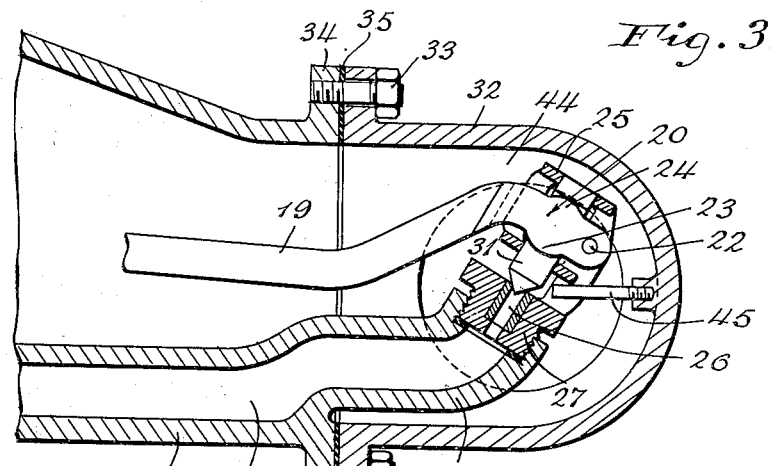
Figure 3 is a vertical section through the portion of the device shown in Figures 1 and 2.

The device illustrated in Figures 1 to 4 of the drawings comprises a main casing 10 enclosing a float 11 which is situated within a substantially cylindrical chamber 12. The casing 10 is connected with an inlet pipe 13 by the bolts 14.

The outlet pipe 15 is situated at the opposite side of the casing and is connected therewith by the bolts 16.

A passage 17 formed in the casing 10 is in communication with the interior of the pipe 13 and leads to a passage 18 which is in communication with the chamber 12.

The float 11 is connected by a lever 19 with the valve mechanism 20 of the usual type.

This mechanism comprises a support 21 carrying a pivot 22 which is connected with one end of the lever 19. The bent portion of the lever 19, which is adjacent the pivot 22, is provided with two abutments 23 and 24 which are situated at opposite sides of the lever 19.

The abutments 23 and 24 are adapted to come in contact with a valve body member 25.

An oscillation of the lever 19 caused by a movement of the float 11 will cause a movement of the member 25 and the valve body 31 which will thereby open and close an outlet opening 26 formed in the plug 27. The plug 27 is screwed into the opening of a projecting tubular member 28 which constitutes a part of the casing 10 and which is provided with a passage 29, one end of which communicates with the interior of the outlet pipe 15 while the opposite end of the passage 29 is in communication with the central passage 26 provided in the plug 27. The member 28 projects far beyond the casing 10.

The float chamber 12 of the casing 10 is closed by any suitable cover 30.

The valve body 31 has operative, preferably conical surfaces which are adapted to contact the edges of the opening 26 and thereby close this opening as soon as the level of the water in the chamber 12 has sunk to a predetermined extent.

Figure 4:
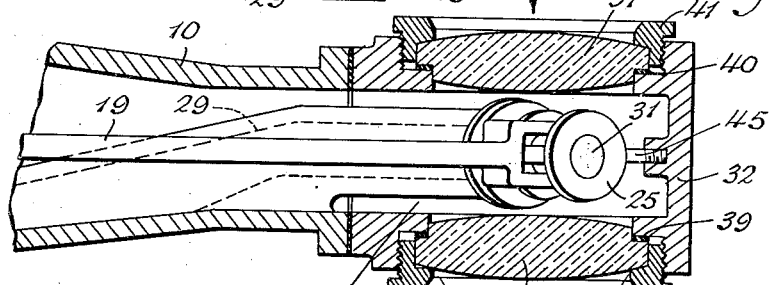
Figure 4 is a horizontal sectional view through the device shown in Figure 3.

As shown in Figures 2 and 4, the valve mechanism 20 and the projecting tubular member 28 which carries this valve mechanism are comparatively narrow and elongated in form and all the essential parts of the valve mechanism are readily accessible to an operator.

The valve mechanism 20 is enclosed by a casing 32 which is also comparatively narrow and which is connected by the bolts 33 with a flange 34 constituting an integral part of the casing 10.

A packing ring 35 may be interposed between the flange 34 and the casing 32 to provide a watertight connection.

As shown in Figures 1 and 4, two glass plates or lenses 36 and 37 are situated at both sides of the valve mechanism 20. The lens 36 is carried by a frame 38 which is screwed into an opening formed in the casing 32.

A packing ring 39 is interposed between the lens 36 and the frame 32 to provide a watertight connection.

Another packing ring 40 is situated between the lens 37 and the casing 32. The lens 37 is carried by a frame 41 which is screwed into an opening provided at the opposite side of the casing 32.

As shown in Figure 4, the two lenses 36 and 37 are situated very closely to the valve mechanism 20 so that the valve mechanism can be readily inspected by an operator.

The side surfaces of the lenses 36 and 37 extend parallel to the passage 29 and to the central axis of the valve mechanism 20.

It may be desirable to use a lens 36 of such form that the light rays from a source of light 42 would be concentrated by it upon the comparatively small operative area of the valve mechanism 20.

On the other hand, the glass element 37 may have the form of a magnifying lens so that an operator looking in the direction of the arrow 43 (shown in Figure 5) will be able to see clearly all the parts enclosed by the casing 32.

As shown in Figures 1 and 3, the lenses 36 and 37 are preferably round and their centers are situated substantially opposite the operative surfaces of the valve mechanism 20, namely the surfaces of the valve seat or projecting member 31 and the edges of the opening 26 which is closed by the member 31.

As shown in Figure 4, each of the lenses 36 and 37 is provided with a narrow portion which fills in the opening formed in the casing 32 and a wider flange portion engaged by the packing 39 or 40.

Due to this arrangement, a perfectly watertight connection is established.

Steam penetrates into the device through the pipe 13, flows through the channel 18 into the interior 44 of the casing 32 and leaves the chamber 44 through the passages 26 and 29 and the pipe 15, provided that the float 11 is in a position in which the passage 26 is not closed by the valve mechanism 20.

It will be noted that the water in this case must pass through a comparatively narrow space at a comparatively high speed so that the inner surfaces of the glass plates or lenses 36 and 37 will be cleaned by the water itself. The flow of the water which is directed by the side walls of the casing 32 will be clearly visible to an observer who will be able to see the impurities floating in the water.

The operator will be able to see the flow of the water very clearly through the glass plate or lens 37, particularly since the side walls formed by the plates or lenses 36 and 37 will direct the flow of the water.

The water flowing through the chamber 44 will carry with it certain impurities such as rust particles and the like, thus enabling the operator to trace very clearly the direction of its flow.

It is advisable to provide a rod 45 which consists of a readily corrodible material and which extends adjacent the valve mechanism 20. The gradual corrosion of the rod 45 would be readily observed by an operator and this will enable him to draw his conclusions as to the state of corrosion in the various parts of the mechanism or of the various steam or water conduits.

Figure 5:
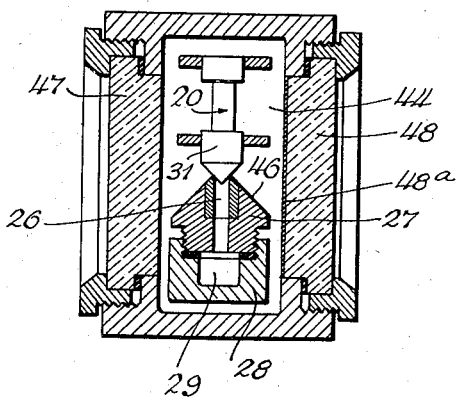
Figure 5 shows in cross section, a steam trap of somewhat different form.

In the construction shown in Figure 5, the plug 27 which is mounted upon the tubular member 28 is provided with conical surfaces 46 which extend upwardly in a direction toward the center of the chamber 44.

The opening 26 formed in the plug 27 is closed by the valve body 31 in the usual manner.

The advantages of providing conical surfaces 46 is that the impurities carried by the water cannot be readily deposited upon the surfaces.

Figure 6:
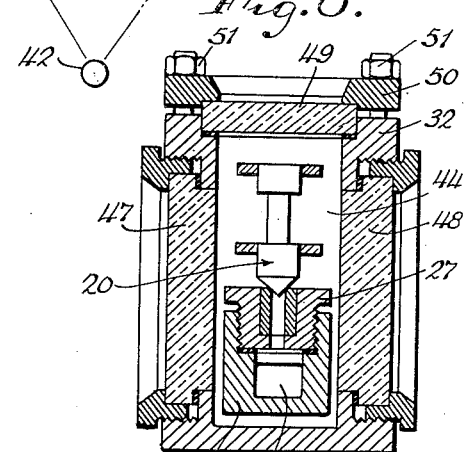

A further advantage is that the operation of the valve mechanism 20 can be readily observed in this case by an operator who is looking through the glass plate 47. The plate 48 constituting a part of the casing may be provided with an opaque light reflecting surface 48a. In this construction there is consequently only one light transmitting member 47, the opposite surface of the casing being light-reflectant. The steam trap shown in Figure 6 of the drawings, comprises a valve mechanism 20 of the usual type which is adapted to close the central opening of a plug 27 carried by a tubular member 28.

The casing 32 enclosing the valve mechanism 20 and the projecting tubular member 28 comprises three glass plates, namely, the two side plates 47, 48 and a third glass plate 49 which is situated above the valve mechanism 20.

The glass 49 may be of oval shape and may be used for the purpose of transmitting light into the interior 44 of the casing 32.

Due to the provision of this third glass the clarity of vision is enhanced since light coming from a light source does not travel directly toward the eyes of the observer. The glass plate 49 may be connected with the casing 32 by means of a frame 50 and bolts 51.

Figure 7 shows a valve mechanism 20 of the usual type which is enclosed by a casing 52 provided with two converging side walls 53 and 54.

Two glass plates 47 and 48 are carried by these converging side walls. This arrangement has the advantage that light passing through the glass plate 47 or glass plate 48, is inclined in relation to the valve mechanism 20 so that it does not blind the operator who is situated on the opposite side of the casing 52.

It is possible to select the angle of inclination of the light rays passing through one of the transparent plates 47, 48 or to arrange the illumination in such manner relatively to the angle of inclination of the walls 53 and 54 that the operator will not be blinded by the light.

Figure 8 shows a casing 55 enclosing the valve mechanism 20 and provided with converging side walls 56 and 57 carrying the glass plates 47 and 48 respectively.

The side walls 56 and 57 converge toward the front of the valve mechanism 20. Due to this arrangement, the light passing through either the plate 47 or plate 48 will not blind the observer situated at the opposite side of the casing 55.

In the examples illustrated, the front wall 58 of the casing 55 consists of a non-transparent material. It is possible, however, to provide a glass plate in lieu of the front wall 58.

In such case, it is not necessary to use converging walls 56 and 57, since light penetrating into the interior 59 of the casing 55 will not blind the operator looking at the valve mechanism 20 through either the glass plate 47 or glass plate 48.

The described steam traps operate in substantially the same manner as the steam separators described in my copending application for United States Letters Patent, Serial No. 54,610 filed December 16, 1935, now Patent No. 2,089,998, granted August 17, 1937.

Due to the fact that in all the described constructions the casing carrying the lenses or the glass plates is of narrow and elongated form, it leaves only a narrow passage of the water so that the flow of the water will be clearly visible to an observer. Furthermore, the direction of the flow of the water will be parallel to the side surfaces of the glass plates and all the impurities contained in the water will be clearly visible, thus enabling a skilled observer to detect defects not only in the steam trap itself, but also in all other steam and water conduits.

It is apparent that the specific illustrations shown above have been given by way of illustration and not by way of limitation and that the structures above described are subject to wide variation and modification without departing from the scope or intent of the invention, all of which variations and modifications are to be included within the scope of the present invention, for example, the transparent glass plates or lenses may be connected by any suitable means with their casing and the valve mechanism may be of any convenient construction.

What is claimed is:

1. A device for removing a condensate comprising a main casing having an inlet and an outlet passage formed therein, a valve mechanism carried by said casing and adapted to interrupt the connection between said inlet passage and said outlet passage, a float situated within said casing for controlling said valve mechanism, a lever having one end connected with said float and the other end connected with said mechanism and operating said mechanism, a removable casing enclosing said valve mechanism and connected to said main casing, the second mentioned casing being elongated to form a substantially narrow passage for the flow of water, a pair of transparent members mounted in opposite sides of the second-mentioned casing whereby the flow of water may be readily inspected for impurities in said condensate, and a third light transmitting member mounted in the wall of the second-mentioned casing and extending substantially at right angles to at least one of the first-mentioned transparent members whereby the clarity of vision will be enhanced.

2. In a device for removing a condensate, the combination with a valve mechanism; of a casing entirely enclosing said valve mechanism, said casing being substantially narrow, longitudinally elongated and having a substantially uniform longitudinal cross section to guide the condensation water in an even, uniform column, a transparent member in the wall of said casing for inspecting said column, said member being mounted centrally opposite the operative surfaces of said valve mechanism and extending parallel to said column and to the central axis of said valve mechanism, the interior surface thereof being flush with the interior surface of said casing.

3. In a device for removing a condensate, the combination with a valve mechanism; of a casing entirely enclosing said valve mechanism, said casing being substantially narrow, longitudinally elongated and having a substantially uniform longitudinal cross section to guide the condensation water in an even, uniform column, a transparent member in the wall of said casing for inspection of said column, said member being mounted centrally opposite the operative surfaces of said valve mechanism and extending parallel to said column and to the central axis of said valve mechanism, the interior surface thereof being flush with the interior surface of said casing, and a rod consisting of substantially corrodible material so mounted within said casing that the end thereof will be clearly visible through said transparent member.

4. In a device for removing a condensate, the combination with a valve mechanism; of a casing entirely enclosing said valve mechanism, said casing being substantially narrow, longitudinally elongated and having a substantially uniform longitudinal cross section to guide the condensation water in an even, uniform column, a transparent member in the wall of said casing for inspection of said column, said member being mounted centrally opposite the operative surfaces of said valve mechanism and extending parallel to said column and to the central axis of said valve mechanism, the interior surface thereof being flush with the interior surface of said casing and means for concentrating light passing through said transparent member upon said valve mechanism.

GUSTAV F. GERDTS.